United States Patent [19]

Bednarz et al.

[11] 4,339,811
[45] Jul. 13, 1982

[54] TROLLING DEPTH CONTROLLER

[75] Inventors: John J. Bednarz, Elmhurst; Phillip J. Moser, Bensenville; Roger L. Rosenberg, Arlington Heights, all of Ill.

[73] Assignee: Circom, Inc., Bensenville, Ill.

[21] Appl. No.: 208,495

[22] Filed: Nov. 20, 1980

[51] Int. Cl.³ .................... G01S 15/88; A01K 89/00
[52] U.S. Cl. .................... 367/96; 43/26.1; 43/27.4; 367/106; 367/108
[58] Field of Search .................... 367/96, 106, 108; 43/26.1, 27.4

[56] References Cited

U.S. PATENT DOCUMENTS

| | | | |
|---|---|---|---|
| 2,709,868 | 6/1955 | Routh | 43/15 |
| 3,835,571 | 9/1974 | Berry | 43/21 |
| 3,910,524 | 10/1975 | Ireland | 43/6.5 X |
| 3,922,808 | 12/1975 | Rieth et al. | 367/96 X |
| 4,004,366 | 1/1977 | Berry | 43/27.4 |
| 4,079,539 | 3/1978 | Holstein | 43/43.13 |
| 4,253,165 | 2/1981 | Christiansen | 367/96 |

*Primary Examiner*—Richard A. Farley
*Attorney, Agent, or Firm*—Hill, Van Santen, Steadman, Chiara & Simpson

[57] ABSTRACT

An automatic trolling depth controller is disclosed for a fishing boat employing a downrigger system. A sonar depth indicating unit with a sonar transducer continuously measures changing depth as the boat trolls. A depth control unit is connected thereto which automatically raises and lowers the trolling line via a reversible motor in response to depth indicating signals of the depth indicator unit so as to automatically maintain the end of the trolling line at a substantially constant given spacing from the bottom despite variations in lake depth as the fishing boat trolls.

15 Claims, 6 Drawing Figures

TROLLING DEPTH CONTROLLER

BACKGROUND OF THE INVENTION

It has been known for fishing near the bottom of a lake to employ a downrigger system wherein a relatively strong trolling line is played out from a rear of the boat and having a heavy weight attached thereto so that it descends substantially vertically to the bottom even during trolling motion. A fishing line is releasably attached to the weight so that when a fish strikes, the fishing line is released from the weight and the fisherman can play the fish without interference from the downrigger weight.

With such systems it is difficult to maintain the end of the trolling line with the weight near the bottom of the lake since the depth changes as the boat trolls.

To be effective, the fishing lure should follow the contour of the bottom since the fish hold around structure formations on the bottom.

SUMMARY OF THE INVENTION

It is an object of the invention to provide an automatic trolling system which will automatically adjust a height of the weight of a downrigger system or the fishing bait or lure in conformance with changes in bottom contour.

It is a further object of the invention to provide an automatic trolling system which will return a downrigger line to the surface while the fisherman is fighting the fish.

It is a further object of the invention to provide an automatic trolling system which will maintain a given spacing of the end of the trolling line from the bottom and store said spacing so that the end of the trolling line can be returned thereto after temporarily raising the line.

According to the invention, an electronic depth indicating unit continually scans a bottom of the lake and provides electronic depth indicating signals representative of a changing depth beneath the boat. A depth control unit drives a reversible motor to raise and lower the trolling line in response to the depth indicating signal so as to automatically maintain an end of the trolling line at a substantially constant given spacing from the bottom despite variations in lake depth as the fishing boat trolls. The system further allows automatic restoration of the line to the given spacing after temporarily raising the line.

DESCRIPTION OF THE PREFERRED EMBODIMENTS

Figure 1:
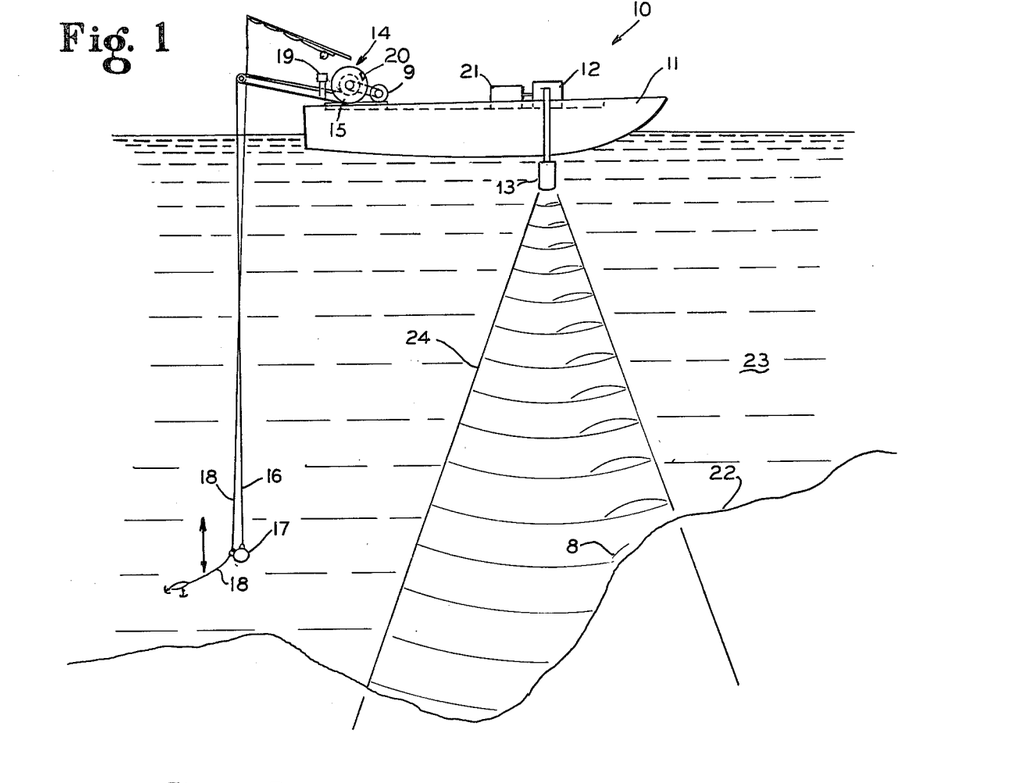
FIG. 1 is a side view illustrating a fishing boat with a downrigger system utilizing the automatic trolling depth control system of the invention.

A fishing boat equipped with a trolling depth control system of the invention is generally illustrated at 10 in FIG. 1. The boat 11 has a sonar unit 12 preferably positioned at a front of the boat. Attached to the sonar unit is a sonar transducer 13 which projects a sonar radiation pattern 24 resulting in reflections 8 from a bottom 22 of the lake.

Preferably at a rear of the fishing boat 11 a downrigger system 14 is employed in which a downrigger line 16 is played out in substantially vertical fashion towards a bottom of the lake as a result of a heavy weight 17 at the bottom end thereof which maintains the downrigger line in a substantially vertical configuration during trolling. A downrigger reel 15 raises and lowers the downrigger line 16 in known manner. A fishing line 18 releasably connects at the weight 17 such that when a fish strikes, the fishing line is pulled free of the downrigger line to permit the fisherman to play the fish without influence from the downrigger line. With the invention it is also possible to employ a fishing line with a weight which positions the fishing line near the bottom 22.

Attached to the downrigger reel 15 is a reversible DC motor 9. Also, a reel sensor 19 is positioned at the reel which detects passage of a magnet 20 on a rotary portion of the reel.

A depth control unit 21 connects with the sonar unit 12 and is responsive to depth indicating signals resulting from the reflections 8 through the water 23 which indicate the depth of the bottom 22.

Preferably the sonar unit 12 and/or the transducer 13 is mounted forwardly of the downrigger line 16 and the weight 17 so that the bottom depth can be determined at a point in time prior to passage by the weight 17 so as to compensate for raising and lowering time of the downrigger line 16.

Figure 2:
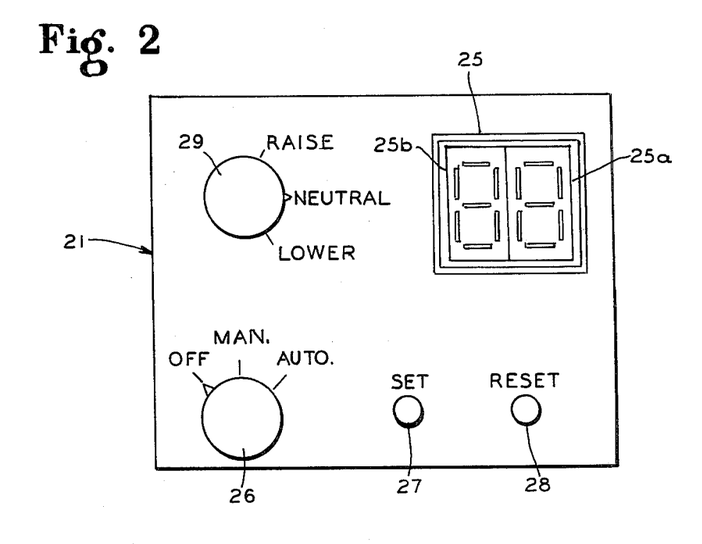
FIG. 2 is a front view of a depth control unit portion of the invention.

As illustrated in FIG. 2, the depth control unit 21 has a line depth display 25 with a units display 25a and a tens display 25b so as to permit measuring depth up to 99 feet. An off-manual-auto three-position function switch 26 is provided together with a set switch 27, a reset switch 28 and a raise-neutral-lower switch 29.

Figure 3:
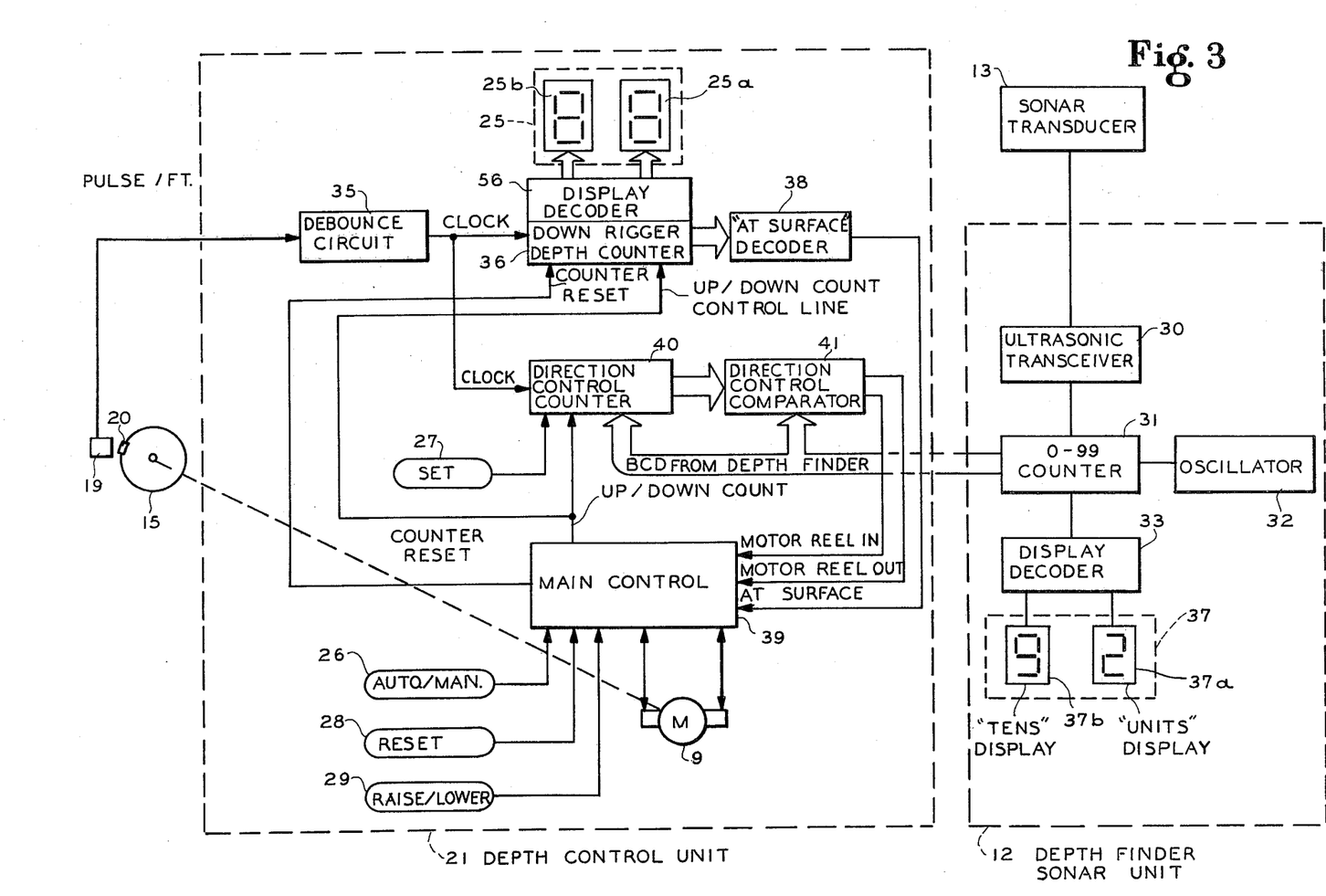
FIG. 3 is a block diagram illustrating the automatic depth control system of the invention.

As shown in FIG. 3, the sonar transducer 13 connects to an ultrasonic transceiver 30. The sonar transducer is a device well known in the art and in the preferred embodiment a Radar Sonics, Inc. device was employed. The ultrasonic transceiver is preferably embodied by National Semiconductor integrated circuit No. LM1812. Signals representative of the time of the emission of a sonic wave and the subsequent time of reception of a reflected sonic wave are provided by the ultrasonic transceiver to the 0 to 99 counter 31, well known in the art and is similar to the counters 57 and 58 described hereafter in relation to the downrigger depth counter. The counter 31 counts the pulses of an oscillator 32 between the outgoing and incoming ultrasonic waves. The resulting BCD output is transmitted to the depth control unit 21 as a BCD "tens" data information and as a BCD "units" data information. A display decoder 33 well known in the art displays the "tens" and "units" data on the units display 37a and the tens display 37b of the display panel 37 which ultimately illustrates depth of the lake bottom. The decoder 33 may include integrated circuit type National Semiconductor or Fairchild 4511.

Any sonar unit having a BCD output for units and tens may be employed for sonar unit 12 in the invention.

The depth control unit 21 shown in FIG. 3 connects with a reel sensor 19 preferably comprised of a reed pick-up switch 42 which is activated each time a magnet 20 on reel 15 passes the reed switch. Typically given a reel periphery of one foot, one pulse will then be emitted per foot of trolling line played out.

Reel sensor 19 connects to a debounce circuit 35, to a downrigger depth counter circuit 36, and display decoder 56 and to a direction control counter 40. Display decoder 56 drives display 25 having a units display 25a and a tens display 25b.

An "at surface" decoder 38 receives information from the downrigger depth counter and connects an output signal to the main control 39.

The BCD output data of depth finder unit 12 is fed to a direction control counter 40 and a direction control comparator 41. The set switch 27 connects with counter 40. The output of the direction control comparator 40 feeds the main control unit 39. The main control unit also controls the motor 9 and receives instructions from the auto/manual switch 26, the reset switch 28 and the reel in/reel out or raise and lower switch 29.

Circuitry for the preferred embodiment of the invention for the circuit blocks discussed above in the depth control unit 21 will be explained hereafter together with the functional description of the depth controlling system of the invention.

At the outset, it is noted that in one alternate embodiment of the invention, a plurality of trolling lines may be employed in which case a plurality of depth control units 21 would be provided for each trolling line and reel assembly. A common depth finder sonar unit 12 would then feed depth information to each of the depth control units 21.

Referring now to the controls illustrated in FIGS. 2 and 3, a functioning of the trolling depth control system of the invention will be described. After attaching the baited fish hook or lure to the downrigger weight, the function switch 26 is switched from the off position to the manual position. The operator then actuates switch 29 from the neutral or off position to the "lower" position until the downrigger weight is at the surface of the water. The operator then pushes the reset button 28 which then stores or sets the water level as the reference point for the trolling line to be played out. Thereafter, the operator again actuates button 29 to lower the downrigger trolling line. Preferably during this operation the boat is stationary and the operator notes the current depth beneath the boat such as 92 feet. Desiring to fish four feet off the bottom, the operator continues to lower the trolling line until the digital display 25 indicates eighty-eight feet. Assuming a vertical trolling line, the weight would then be four feet off the bottom. Of course during trolling the trolling line may not be perfectly vertical but may have some angle depending on trolling speed and the amount of weight attached through the downrigger line. In any event, based on experience the operator of the system can take such angle into account. It has been found that with slight deviations from vertical, that the error is insignificant. Of course if greater angles of the trolling line are employed, then the operator from experience would play out somewhat greater than eighty-eight feet of line in order to achieve a four foot spacing from the bottom.

Thereafter, the operator pushes the set button 27 which then stores the desired four foot spacing which is to be automatically maintained in an automatic mode of the unit to be described below.

To initiate automatic operation, the fisherman now switches function switch 26 to the "auto" mode and the weight will substantially maintain the four foot spacing regardless of depth variations. Due to the inertia of the system, of course, time is required to raise or lower the weight during the automatic mode and consequently some negligible deviations from the stored spacing may occur.

When a fish strikes the lure, the operator of the system may momentarily push switch 29 to the "RAISE" position while the unit is in the automatic mode. The unit will then automatically raise the weight to the level of the surface and then stop the reel motor. Thereafter, the fisherman may rebait the hook and reattach the fishing line to the downrigger weight. The fisherman then pushes the reset button 28 and the weight will automatically return to the previously established four foot spacing above the bottom.

If the user decides to manually operate the downrigger system, he may switch the function switch 26 to the manual mode and then utilize switch 29 to raise and lower the downrigger weight. If he then desires to return to the automatic mode and the previously established four feet spacing, he simply switches back to the auto mode and the weight will automatically return to the four foot spacing position above the lake bottom.

If it is desired to select a new automatic spacing distance the operator switches the function switch 26 to the manual mode and actuates the switch 29 to raise or lower the weight to the new desired level such as eighty-six feet for a six foot spacing. He again hits the set button 27 and returns to the automatic mode.

Specific circuitry for the depth control unit 21 in the preferred embodiment will now be generally described. Since the schematic diagrams of FIGS. 4, 5 and 6 clearly show all appropriate connections to allow one skilled in the art to build a depth control unit, a detailed description of each connecting wire will not be presented in view of the detailed drawings.

Figure 4:
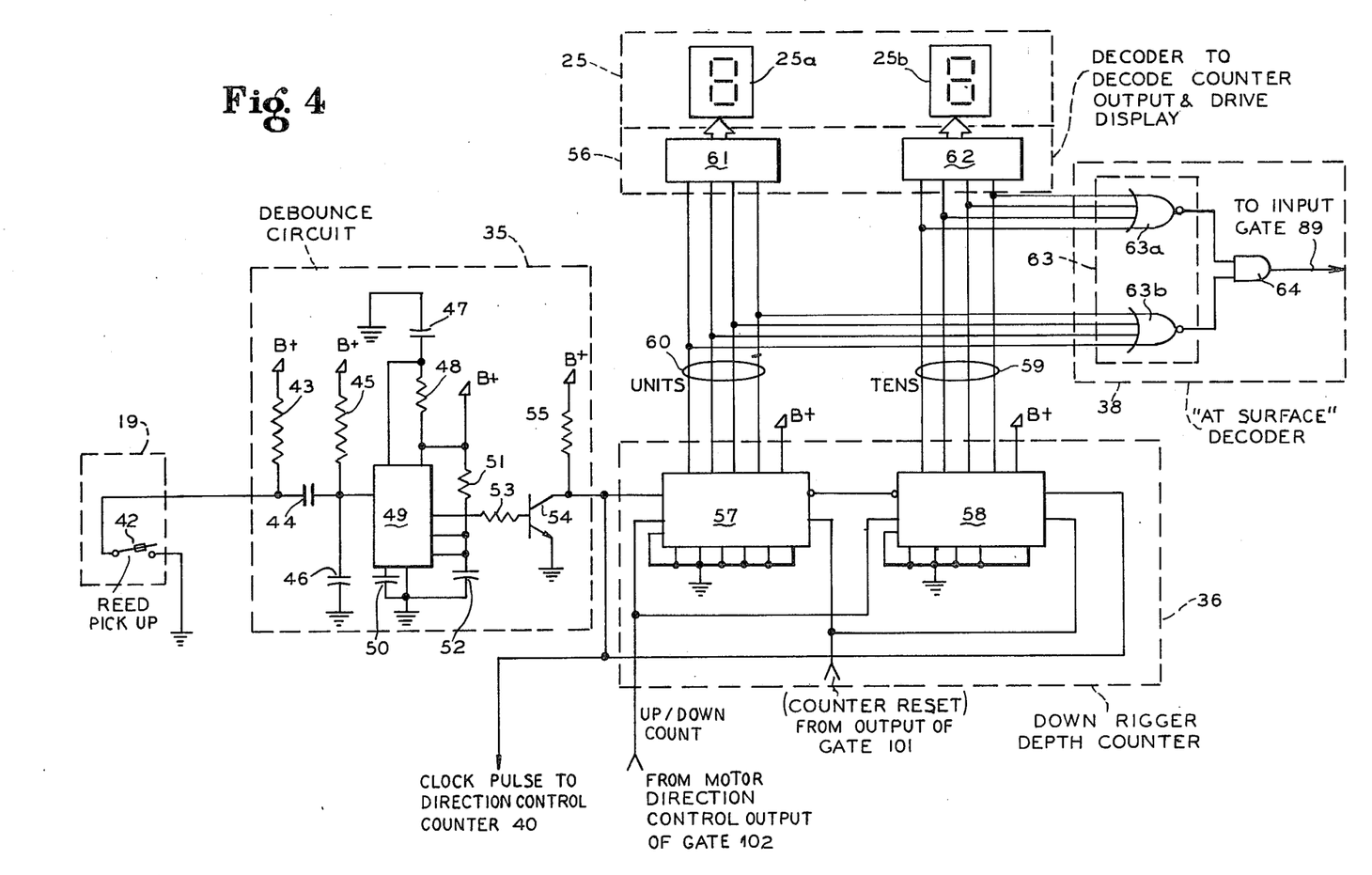
FIG. 4 is a schematic diagram illustrating downrigger depth counter and display circuitry of the depth control unit.

As shown in FIG. 4, the reed pick-up switch 42 receives B+ from resistor 43 and feeds signals through capacitor 44 to 49, Signetics integrated circuit NE555V. This input also has a resistor 45 and a capacitor 46 thereat. Components associated with integrated circuit 49 are the capacitors 50, 52, 47 and resistors 48 and 51. The output from integrated circuit 49 is fed to transistor 54 through resistor 53 fed with B+ through resistor 55. This inverted output is presented to the downrigger depth counter 36 comprised of an integrated circuit 57 for units and an integrated circuit 58 for tens data generation. These integrated circuits are preferably Fairchild 4510 types. The units data 60 and the tens data 59 are then fed to decoders 61 and 62 preferably formed of Fairchild 4511 integrated circuits. A units display 25a connects to decoder 61 and a tens display 25b connects to decoder 62.

The "at surface" decoder 38 receives the units data 60 and the tens data 59 and processes the data with NOR gates 63a and 63b whose outputs are combined at the AND gate 64.

Figure 5:
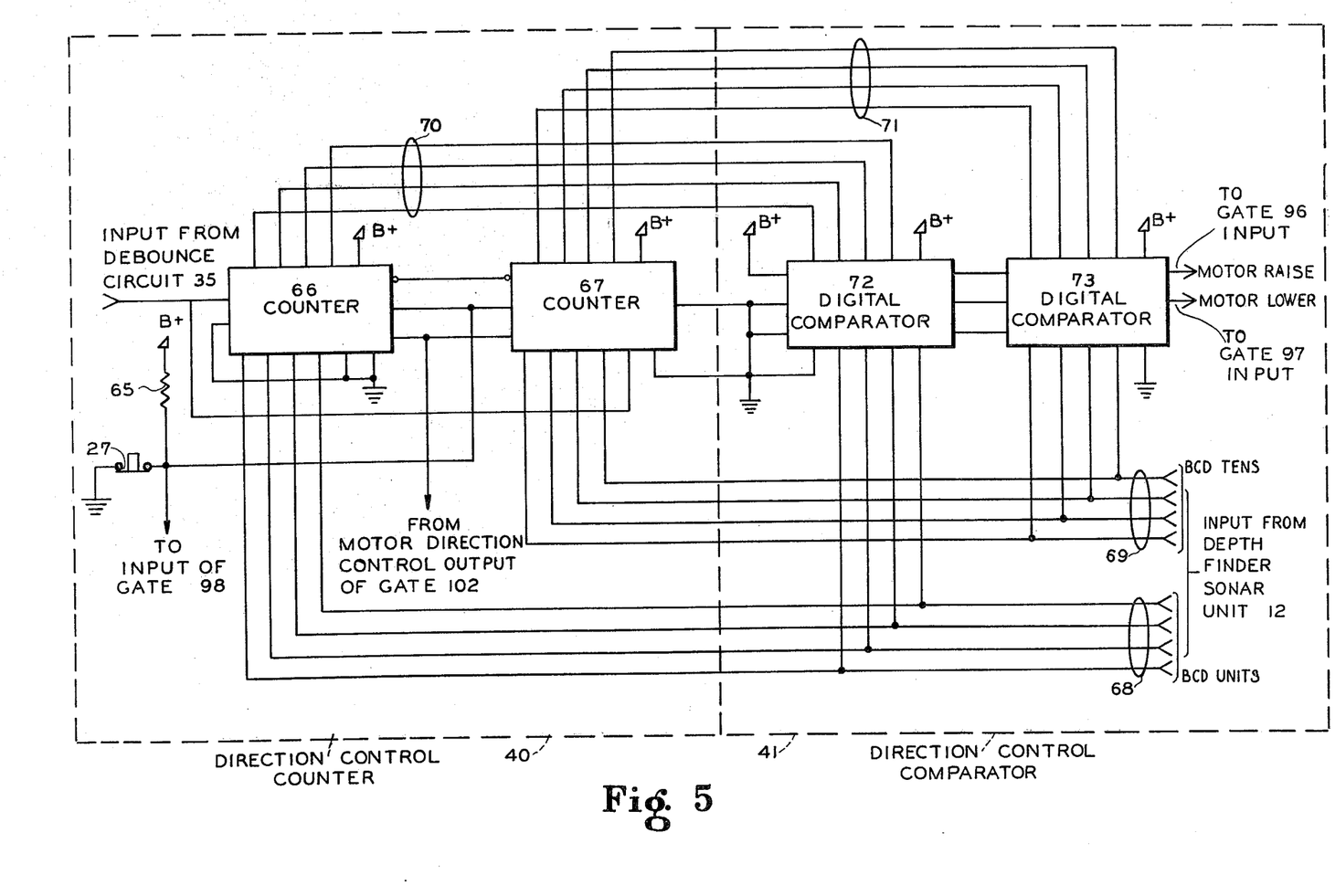
FIG. 5 is a schematic diagram illustrating a direction control counter and direction control comparator circuitry of the depth control unit.

FIG. 5 shows the direction control counter 40 and the direction control comparator 41. The direction control counter 40 has integrated circuits 66 and 67 preferably formed of Fairchild 4510's. A counter 66 receives an input from the debounce circuit 35 and the set button 27 connects between counter 66 and 67. The up/down inputs of the two counters 66 and 67 connect to the motor direction control output of gate 102. The counter outputs at 70 and 71 connect to respective digital comparators 72 and 73 preferably formed of Fairchild integrated circuit 40085. All four of the above described integrated circuits receive the BCD units data 68 and the BCD tens data 69. The digital comparator 73 outputs the motor raise and motor lower control signals.

Figure 6:
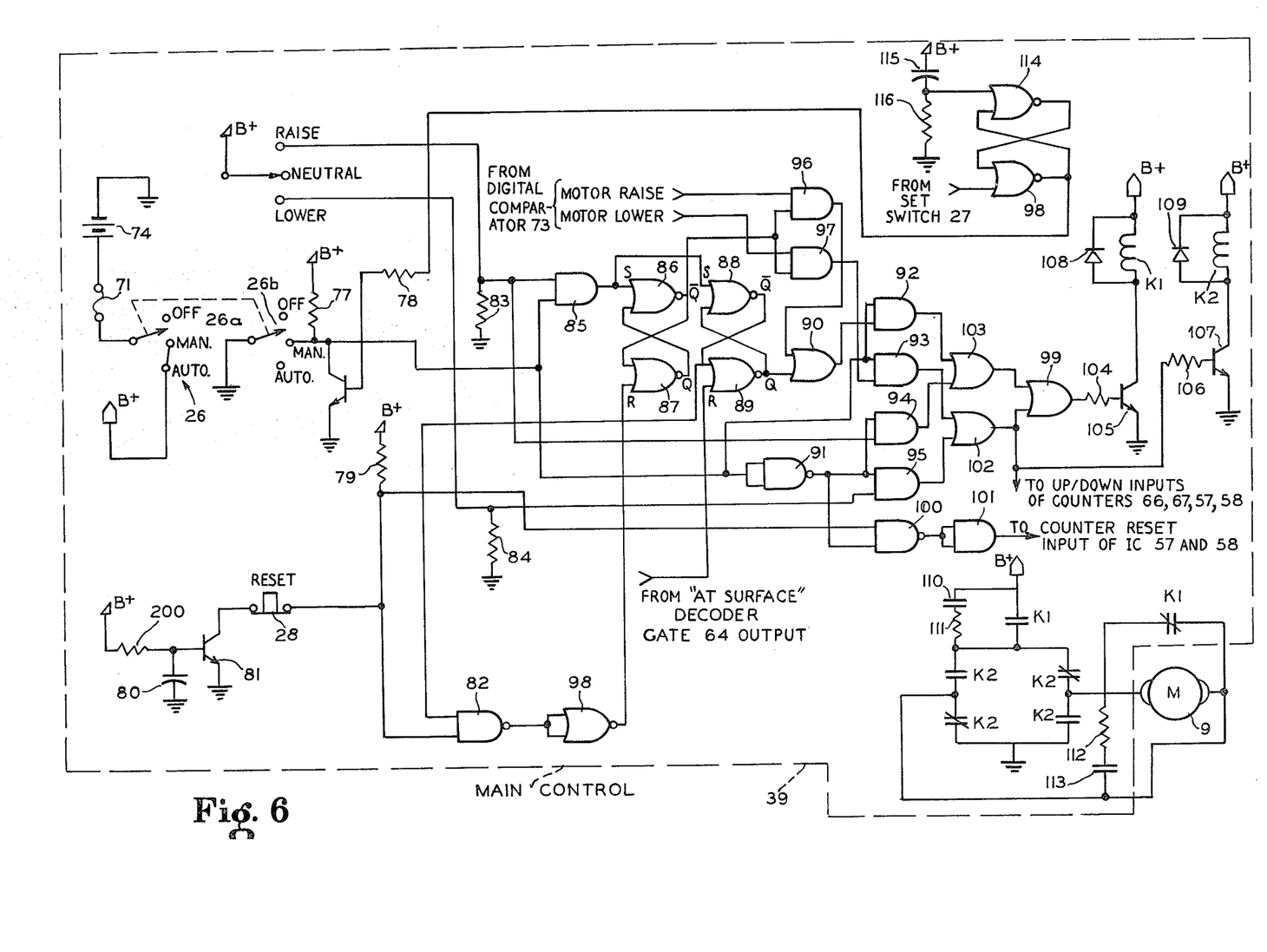
FIG. 6 is a schematic diagram illustrating a main control portion of the depth control unit.

Finally, the main control unit 39 construction is illustrated in FIG. 6. A battery power source 74 connects through fuse 71 to the function switch 26 which feeds B+. This two section switch has sections 26a and 26b with section 26b manual position connecting with a resistor 77 to B+ and also the collector of transistor 76 driven at its base by a resistor 78 receiving signals from NOR gates 98 and 114. The set switch 27 drives the input of NOR gate 98.

The raise and lower switch 29 feeds B+ either to resistor 83 and AND gates 85 and 94 or resistors 84 and AND gate 95.

The reset switch 28 connects the output of transistor 81 connecting at its base to B+ to NAND gate 82 and NOR gate 98.

The output from digital comparator 73 is connected to AND gate 96 and AND gate 97 as shown. Also the "at surface" decoder output at gate 64 connects to NOR gate 89.

The specific connection pattern for the following logic gates can be discerned from FIG. 6: gates 85, 86, 87, 88, 89, 90, 96, 97, 91, 92, 93, 94, 95, 100, 101, 102, 103, and 99.

Two motor control relays k1 and k2 are provided having diodes 108 and 109 across their coils and driven by transistors 105 and 107. The switch contacts illustrated as k1' and k2' are connected as shown in FIG. 6 to control the reversible motor 9 in either direction.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. An automatic trolling depth controller for a fishing boat, comprising: sonar depth indicating means for positioning on the boat and having a sonar transducer connected thereto; a trolling line played out from a position on the boat; a reversible motor connected to raise and lower the trolling line; a depth control unit means connected to drive the motor to raise and lower the trolling line in response to depth indicating signals of the depth indicating means so as to automatically maintain the end of the trolling line at a substantially given constant spacing from the bottom despite variations in lake depth as the fishing boat trolls; the depth control unit means including means for selectively automatically raising the trolling line by a momentary initial operator command during automatic operation so that the end of the trolling line is returned automatically to the surface without operator control during the raising and then upon subsequent operator momentary command automatically lowering the end of the trolling line back to said given spacing without operator control during the lowering.

2. The controller of claim 1 wherein the depth control unit means includes means for computing and displaying a length of the trolling line which has been played out from a given fixed reference point to the end of the line.

3. The controller of claim 1 wherein the fixed reference point is the point where the line enters the water such that the length of line in the water is displayed.

4. The controller of claim 2 wherein the means for computing and displaying includes a magnet mounted on a trolling line reel and switch means activated by the means for each rotation of the reel.

5. The controller of claim 2 wherein the means for computing and displaying includes sensor means on a trolling line reel for generating pulses corresponding to unit lengths of line, and means for counting said pulses.

6. The controller of claim 2 wherein the depth control unit means includes comparator means for continuously comparing the depth indicating signals to signals derived from the length of trolling line established in the means for computing and displaying.

7. The controller of claim 1 wherein the depth control unit means includes means for manually controlling raising and lowering of the trolling line by the motor prior to switching to an automatic mode.

8. The controller of claim 7 wherein the depth control unit means further includes means for selectively storing said given spacing from the bottom when the trolling line is played to a desired length in the manual mode, and the depth control unit means in the automatic mode then automatically substantially maintaining said spacing.

9. The controller of claim 1 wherein the trolling line is a weighted down rigger line which is raised automatically while the fisherman fights the fish on a fishing line.

10. The controller of claim 1 wherein the trolling line comprises a downrigger system wherein a weight is fastened at the end of the line and a fishing line is releasably attached to the weight.

11. The controller of claim 1 wherein the control unit means has a manual mode-automatic mode function switch, a raising and lowering switch operable with the control unit means in the manual mode to raise and lower the trolling line, a set switch operable with the control unit means in the manual mode to set a desired spacing of the end of the line from the bottom to be automatically maintained in the automatic mode, a reset switch operable with the control unit means in the manual mode to prepare the controller for setting of a new given spacing, and the reset switch operable with the control unit means in the automatic mode is automatically return the end of the line to said given spacing.

12. The controller of claim 11 wherein the raising and lowering switch is operable with the control unit means in the automatic mode to automatically raise the end of the trolling line upon operator command to the surface and the stopping reeling in of the line.

13. The controller of claim 1 has a weight thereon and wherein the trolling line is played out in a direction substantially vertically toward the bottom during trolling.

14. An automatic trolling system for a fishing boat having a reversible motor driven trolling line, comprising: electronic depth indicating means for continually scanning a bottom of the water and providing electronic depth indicating signals representative of a changing depth beneath the boat; depth control unit means for driving the motor to raise and lower the trolling line in response to said depth indicating signals so as to automatically maintain an end of the trolling line at a substantially constant given spacing from the bottom despite variations in water depth as the fishing boat trolls, said depth control unit means also including storage means for storing said constant given spacing, and automatic raising and lowering means for automatically raising the trolling line end to a region of a surface of the water by an initial momentary operator command but without the need for further operator control during the raising and automatically lowering the trolling line to the stored constant given spacing by an initial momentary operator command but without the need for further operator control during the lowering.

15. The system of claim 14 wherein the depth indicating means scans the bottom depth in a trolling direction in front of the end of the trolling line.

* * * * *

UNITED STATES PATENT AND TRADEMARK OFFICE
CERTIFICATE OF CORRECTION

PATENT NO. : 4,339,811
DATED : July 13, 1982
INVENTOR(S) : John J. Bednarz et al.

It is certified that error appears in the above-identified patent and that said Letters Patent is hereby corrected as shown below:

Column 6, Claim 11, line 48, "is" should read -- to --.

Signed and Sealed this

Eleventh Day of October 1983

[SEAL]

Attest:

GERALD J. MOSSINGHOFF

Attesting Officer    Commissioner of Patents and Trademarks